United States Patent
Meyer (10) Patent No.: US 8,363,617 B2
(45) Date of Patent: Jan. 29, 2013

(54) SELECTING AN ACCESS POINT FROM A PLURALITY OF ACCESS POINTS

(75) Inventor: David Meyer, East Meadow, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 695 days.

(21) Appl. No.: 12/199,599

(22) Filed: Aug. 27, 2008

(65) Prior Publication Data

US 2010/0054179 A1 Mar. 4, 2010

(51) Int. Cl.
*H04W 4/00* (2009.01)

(52) U.S. Cl. ..... 370/331; 370/338; 370/401; 455/432.1; 455/435.2; 455/437; 455/452.2

(58) Field of Classification Search .......... 370/328–333, 370/338, 400, 401; 455/432.1, 435.2, 437, 455/450, 452.1, 452.2
See application file for complete search history.

(56) References Cited

U.S. PATENT DOCUMENTS

| 7,676,226 B2* | 3/2010 | Han et al. ............... 455/436 |
|---|---|---|
| 2004/0039817 A1 | 2/2004 | Lee et al. |
| 2006/0187873 A1 | 8/2006 | Friday |
| 2006/0223526 A1 | 10/2006 | Qi et al. |
| 2007/0091907 A1* | 4/2007 | Seshadri et al. .......... 370/401 |
| 2008/0198811 A1* | 8/2008 | Deshpande et al. ....... 370/332 |
| 2009/0028101 A1* | 1/2009 | Kakumaru ................. 370/329 |
| 2009/0086660 A1* | 4/2009 | Sood et al. ................ 370/311 |
| 2009/0190500 A1* | 7/2009 | Ji et al. ..................... 370/254 |
| 2011/0216692 A1* | 9/2011 | Lundsgaard et al. ....... 370/328 |

* cited by examiner

*Primary Examiner* — Christopher Grey (57) ABSTRACT

Techniques are provided for selecting an access point (AP) to communicate with from a plurality of candidate access points (APs) when a wireless computing device (WCD) roams in a wireless local area network (WLAN). The WCD stores a pairwise master key (PMK) for each access point that the WCD has previously established a PMK with during authentication. The WCD a plurality of candidate access points and determines an AP statistic (APS) associated with each candidate AP. The WCD then determines an AP rating for each candidate AP based on the APS for the candidate AP and whether the wireless computing device has a pairwise master key stored for the candidate AP. The WCD then selects a particular one of the candidate APs having the highest AP rating as a desired AP of the wireless computing device.

17 Claims, 3 Drawing Sheets

Equation (1)
AP_RATING = (APS$_1$ *± APS$_1$_WEIGHT) + (HAS_PMK * PMK_WEIGHT)

FIG. 4

Equation (2)
AP_RATING = (APS$_1$ *± APS$_1$_WEIGHT) ... + (APS$_N$ *± APS$_N$_WEIGHT) + (HAS_PMK * PMK_WEIGHT)

FIG. 5

Equation (3)
AP_RATING = (APS1 *± APS1_WEIGHT) + (APS$_2$ *±APS$_2$_WEIGHT) + (APS$_3$ *±APS$_3$_WEIGHT) + (HAS_PMK * PMK_WEIGHT)

FIG. 6

Equation (4)
AP_RATING = (RSSI * RSSI_WEIGHT) + (AGE *- AGE_WEIGHT) + (MISSED_PROBES *- MISSED_PROBES_WEIGHT) + (HAS_PMK * PMK_WEIGHT)

FIG. 7

SELECTING AN ACCESS POINT FROM A PLURALITY OF ACCESS POINTS

FIELD OF THE INVENTION

The present invention generally relates to network communications, and more particularly relates to techniques for selecting an access point from a plurality of access points in a wireless local area network (WLAN).

BACKGROUND OF THE INVENTION

Wireless computer networks have been defined in which a wireless computing device communicates with a network via an access point.

When a wireless computing device (also referred to as a "station" or "node") wants to access a WLAN, for example after power-up, sleep mode, or moving to a new area, the wireless computing device searches for access points (APs) by scanning. The IEEE 802.11 standard defines both passive and active scanning. As used herein, "IEEE 802.11" refers to a set of IEEE Wireless LAN (WLAN) standards that govern wireless networking transmission methods. IEEE 802.11 standards have been and are currently being developed by working group 11 of the IEEE LAN/MAN Standards Committee (IEEE 802). Any of the IEEE standards or specifications referred to herein are incorporated by reference in their entirety and may be obtained at http://standards.ieee.org/get-ieee802/index.html or by contacting the IEEE at IEEE, 445 Hoes Lane, PO Box 1331, Piscataway, N.J. 08855-1331, USA.

In passive scanning the wireless computing device scans individual channels for beacon frame that are periodically transmitted by the AP. The beacon frame includes synchronization information, and other information about the access point including service set identifier (SSID), supported data rates, etc. Active scanning is optional, and differs from passive scanning in that the wireless computing device tries to locate access points and initiates the scanning process by broadcasting a probe request frame. A probe request frame may include an SSID or can have a null SSID. When the probe request frame includes an SSID, all APs with a matching SSID that receive the probe request frame will respond by transmitting a probe response frame. When the probe request frame includes a null SSID, all APs that receive the probe request frame will respond by transmitting a probe response frame. Active scanning enables a wireless computing device to receive immediate response from access points, without waiting for transmission of a beacon frame.

When the wireless computing device receives a beacon frame it can record information associated with the beacon frame (e.g., corresponding power level and received signal strength) and subsequently use this information to select which access point to communicate through. At the conclusion of the scanning, the WCD generates a scan report that includes parameters for each of the APs that were detected during scanning. For each AP detected the scan report can include a number of parameters.

When the wireless computing device decides to join a BSS associated with a particular one of the detected APs, the wireless computing device undergoes an authentication process with that AP. The authentication process involves the interchange of information between the AP so that each can prove its identity to the other. Early IEEE 802.11 networks implemented one-way authentication mechanisms (i.e., open system authentication and optionally shared key authentication) that exhibited certain weaknesses. For example, such one-way authentication mechanisms only authenticate the wireless computing device to the AP, but do not authenticate the AP to the wireless computing device.

To address weaknesses of one-way authentication mechanisms, the IEEE 802.11i standard was created. Among other things, the IEEE 802.11i standard defines mechanisms for mutual authentication. The IEEE 802.11i standard utilizes the IEEE 802.1x standard for port based network access control. The IEEE 802.1x standard specifies a protocol for generating or deriving a pairwise master key (PMK) (also referred to as a session key) and a groupwise master key (GMK) (also referred to as a group key). The groupwise master key (GMK) is used for multi-cast traffic and is shared among all wireless computing devices connected to the same AP. By contrast, the pairwise master key (PMK) is a symmetric key that is unique to each session between an individual wireless computing device and a particular AP and protects communications between the wireless computing device an its AP. The PMK creates a private virtual port between the wireless computing device and the AP. Pairwise master keys (PMKs) are the foundation of 802.11i security since the PMK is used as source material for generation of lower level keys used by MAC layer encryption. For instance, the PMK is used as part of a four-way handshake between the wireless computing device and the AP to derive, bind, and verify a Pairwise Transient Key (PTK) that is a collection of operational keys including a Key Confirmation Key (KCK) that is used to prove possession of the PMK and to bind the PMK to the AP, a Key Encryption Key (KEK) that is used to distribute a Group Transient Key (GTK), and Temporal Keys that are used for encryption.

A pairwise master key (PMK) is generated via an 802.1X exchange between the wireless computing device and an authentication server (AS). To explain further, when the wireless computing device successfully authenticates with the AS, one of the last messages sent from AS is a Master Key (MK) that is known only to the wireless computing device and the AS. The MK is bound to a session between the wireless computing device and the AS. Both the wireless computing device and the AS perform computations using this MK to derive a Pairwise Master Key (PMK) from the MK; the AS then provides the PMK to the AP. As a result, generation of a PMK involves significant message exchanges and computations that can take a significant amount of time (e.g., several seconds). During this process the wireless client device is unable to send or receive data. To avoid performing a full 802.1X authentication process to generate a PMK each time a WCD connects to a particular AP, the WCD can cache PMKs after establishing them with a particular AP.

Once the authentication process is complete and the wireless computing device is authenticated with the AP, the wireless computing device must associate with the access point before sending data frames. The association process involves the exchange of information about capabilities of the wireless computing device and the AP. Association is necessary to synchronize the wireless computing device and access point with important information, such as supported data rates. The wireless computing device initiates the association by sending an association request frame containing elements such as SSID and supported data rates. The access point responds by sending an association response frame containing an association ID along with other information regarding the access point. Once the wireless computing device and access point complete the association process, they can send data frames to each other.

When the wireless computing device moves about the wireless network or "roams," the wireless computing device can often benefit from associating with and communicating through a different access point even though the wireless computing device is still within communication range of the access point it is currently associated with. To decide which AP the wireless computing device should join and authenticate and associate with as the wireless computing device moves about the network, the wireless computing device implements an AP selection or "roaming algorithm" to make this decision. The IEEE 802.11 standards do not specify a standard roaming algorithm. Instead, the AP selection or roaming algorithms are vendor specific. Many AP selection or roaming algorithms rank APs using one or more performance metrics, such as a Received Signal Strength Indicator (RSSI) that reflects signal strength of a beacon frame received from the AP, and then select the highest ranked AP as the AP to roam to.

Accordingly, it is desirable to provide improved AP selection techniques for use by a wireless computing device as the wireless computing device encounters different APs when moving from one physical location to another in a network. Furthermore, other desirable features and characteristics of the present invention will become apparent from the subsequent detailed description of the invention and the appended claims, taken in conjunction with the accompanying drawings and this background of the invention.

BRIEF SUMMARY

Techniques are provided for selecting an access point (AP) to communicate with from a plurality of candidate access points (APs) when a wireless computing device (WCD) roams in a wireless local area network (WLAN). The WCD stores a pairwise master key (PMK) for each access point that the WCD has previously established a PMK with during authentication. The WCD a plurality of candidate access points and determines an AP statistic (APS) associated with each candidate AP. The WCD then determines an AP rating for each candidate AP based on (1) the APS for the candidate AP and (2) whether the wireless computing device has a pairwise master key stored for the candidate AP. The WCD then selects a particular one of the candidate APs having the highest AP rating as a desired AP of the wireless computing device.

BRIEF DESCRIPTION OF THE DRAWINGS

The present invention will hereinafter be described in conjunction with the following drawing figures, wherein like numerals denote like elements.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention.

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

Exemplary Network

Figure 1:
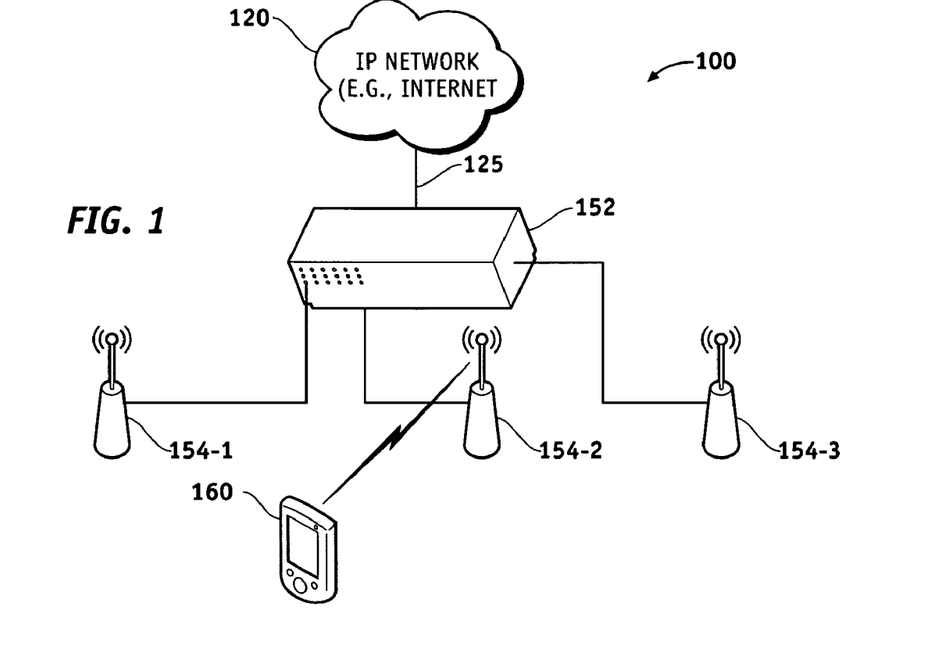
FIG. 1 illustrates an exemplary network.

FIG. 1 illustrates an exemplary network 100 which includes an IP network 120, an optional wireless switch 152, access points 154-1, 154-2, 154-3, and a wireless computing device 160. A link 125 couples the router 118 to the wireless switch 152 over a network 120 which may comprise, for example, the Internet or an intranet. Although FIG. 1 illustrates a single link 125, in other practical implementations, there may be multiple logical links which couple the wireless switch 152 to the router 118.

As used herein, the term "wireless computing device" refers to any portable computer or other hardware designed to communicate with an infrastructure device of an access network over an air interface through a wireless channel. In many cases such wireless computing devices are "handheld" and potentially mobile or "nomadic" meaning that the wireless computing device 160 can physically move around the WLAN 100, but at any given time may be mobile or stationary and can include devices that communicate through a wireless channel. The wireless computing device 160 can be one of any of a number of types of mobile computing devices, which include without limitation, mobile stations (e.g. mobile telephone handsets, mobile radios, mobile computers, hand-held or laptop devices and personal computers, a PC card, personal digital assistants (PDAs), or the like), access terminals, subscriber stations, user equipment, compact flash, external or internal modem, or any other devices configured to communicate via wireless communications. Although not illustrated, each AP can serve multiple wireless client devices within a defined network area. It will be appreciated by those skilled in the art that although FIG. 1 shows an exemplary network configuration in which one wireless computing device 160 is present, in many cases many wireless computing devices can be configured as part of the network 100 at any given time. The wireless computing device 160 can communicate with the APs 154 in accordance with any known communication standards such as those based on IEEE 802.11 (e.g., 802.11a, 802.11b, 802.11g, 802.11n or 802.11s).

The access points 154-1, 154-2, 154-3 are devices that enable the wireless computing device 160 to connect to and communicate with the wireless local area network (LAN) 100. The access points 154-1, 154-2, 154-3 can relay data between the wireless computing devices and wired computing devices on the WLAN 100. The AP directly serves as the point of interconnection between the WLAN and the fixed wired network and allows wireless communication devices to be quickly and easily connected to a wired LAN. In general, an access point is a network-capable device containing a transceiver and antenna for transmitting signals to and receiving signals from the remote client devices or stations. The wireless protocol terminates at the access point. Each access point has full MAC functionality and sufficient program logic and processing power to allow it to enforce policies relating to access and usage. Although only three APs 154-1, 154-2, 154-3 are illustrated in FIG. 1, a conventional wireless local area network (WLAN) 100 can include any number of such access points.

In the embodiment illustrated in FIG. 1, the access points 154 are illustrated as being coupled to a wireless switch 152;

the wireless switch 152 is optional and can be implemented in some, but not all, network architectures. When a wireless switch device 152 is implemented, instead of access points, simplified access ports can be used in conjunction with a wireless switch device 152. These access ports, sometimes referred to as thin access points, have reduced MAC functionality in comparison to regular or "fat" access points that have full MAC functionality, and many of the higher level MAC functions that would be implemented in an access point are implemented at the wireless switch device instead. The wireless switch device 152 serves as a master controller that provides a single point of administration for all access ports it controls. Among other things, a wireless switch device 152 configures controls, manages, and secures the environment for one or more access ports connected to it. In wireless switch/access port architecture, the wireless protocol terminates at the wireless switch. Although not illustrated, the wireless switch 152 typically includes at least one processing unit, memory and wired Ethernet interfaces for a plurality of access ports it supports. In contrast to an access point based network architecture where the access point serves as the termination point for the wireless protocol, in a wireless switch based network architecture, the wireless switch 152 serves as a termination point for a "wireless" protocol, such as the IEEE 802.11 protocol. To explain further, the wireless computing device 160 communicates with an AP 154 over the air via wireless packets (e.g., IEEE 802.11 data packets), and the AP passes the wireless packets to the wireless switch over a wire that connects the wireless switch and the AP 154. In other words, the wireless switch 152 communicates wireless packets encapsulated in wired packets (e.g., IEEE 802.11 packets encapsulated in IEEE 802.3 packets) with the AP 154. The wireless switch 152 receives data packets, going to or received from one of its connected access ports 154, and processes those data packets, which would have traditionally been processed by a "thick" access point. A packet forwarding module of a wireless switch device forwards those data packets based on information contained in their L2 headers, which for a wireless switch are headers corresponding to L2 wireless networking protocols including IEEE 802.11, etc. For instance, in the context of IEEE 802.11 networks, a wireless switch 154 decapsulates inbound IEEE 802.11 data packets received from client device via an access port into IEEE 802.3 packets, and converts/encapsulates outbound IEEE 802.3 packets destined for a client device into IEEE 802.11 data packets before passing them on to an AP for transmission to the wireless computing device 160. The wireless switch then Layer-2 switches the resulting 802.3 packet onto the wire. If the 802.3 packet is destined to the wireless switch itself, then the wireless switch routes the IP packet based on its "routing table." In addition to Layer 2 (L2) switching and Layer 3 (L3) or IP routing of data packets, a wireless switch (WS) also performs a number of additional services/functions.

As noted above, the wireless computing device 160 can authenticate and associate with any of the access points 154 (or alternatively access ports), and during the authentication process establishes a PMK with the AP that it authenticates with. As also described above, to avoid performing a full 802.1X authentication process to generate a PMK each time the wireless computing device 160 connects to a particular AP, the wireless computing device 160 can cache PMKs after establishing them with a particular AP.

Figure 2:
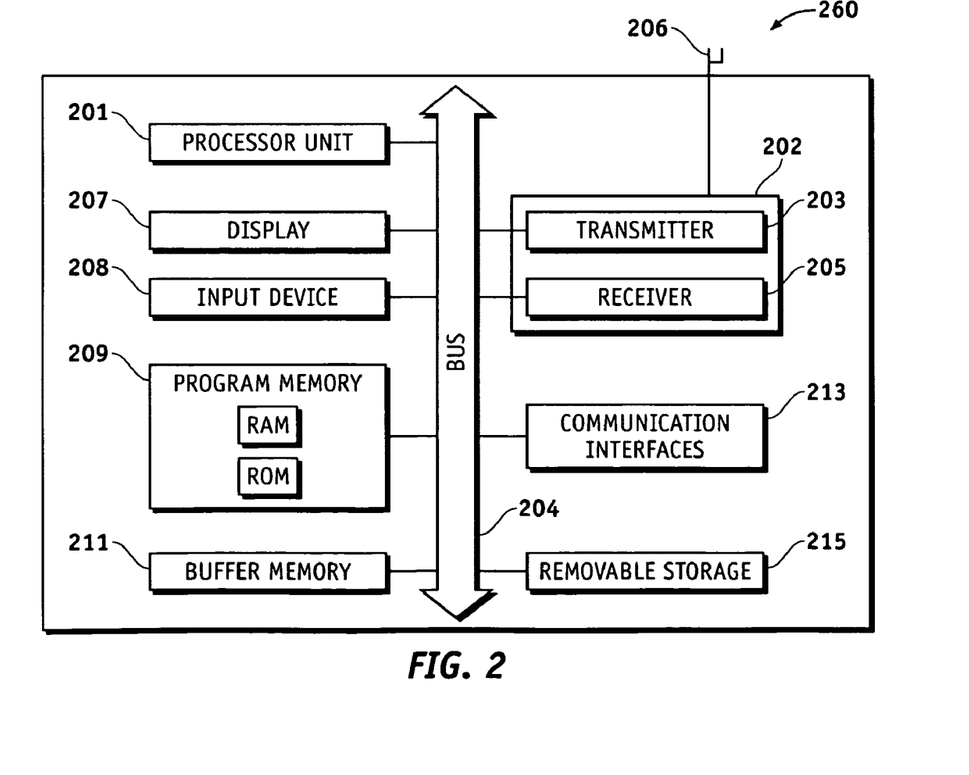
FIG. 2 is a block diagram of a wireless computing device.

FIG. 2 is a block diagram of a wireless computing device 260. The wireless computing device 260 comprises a processor 201, a transceiver 202 including a transmitter circuitry 203 and a receiver circuitry 205, an antenna 206, a display 207, an input device 208, a program memory 209 for storing operating instructions that are executed by the processor 201, a buffer memory 211, one or more communication interfaces 213, and a removable storage unit 215. Although not shown, the wireless computing device 260 also can include an antenna switch, duplexer, circulator, or other highly isolative means (not shown) for intermittently providing information packets from the transmitter circuitry 203 to the antenna 206 and from the antenna 206 to the receiver circuitry 205. The wireless computing device 260 can be an integrated unit containing at least all the elements depicted in FIG. 2, as well as any other elements necessary for the wireless computing device 260 to perform its particular functions. Alternatively, the wireless computing device 260 may comprise a collection of appropriately interconnected units or devices, wherein such units or devices perform functions that are equivalent to the functions performed by the elements of the wireless computing device 260. For example, the wireless computing device 260 may comprise a laptop computer and a wireless LAN (local area network) card.

The processor 201 can include one or more microprocessors, microcontrollers, DSPs (digital signal processors), state machines, logic circuitry, or any other device or devices that process information based on operational or programming instructions. Such operational or programming instructions can be, for example, stored in the program memory 209. As will be described in greater detail below, the processor 201 can include an AP selection module (not illustrated) that is used to perform processing associated with an AP selection method 300.

The program memory 209 may be an IC (integrated circuit) memory chip containing any form of RAM (random-access memory) or ROM (read-only memory), a floppy disk, a CD-ROM (compact disk read-only memory), a hard disk drive, a DVD (digital video disc), a flash memory card or any other medium for storing digital information. Although not illustrated in FIG. 2, the memory 209 can include a PMK cache designed to store a PMK for each AP that the wireless computing device 260 has previously established a PMK with, scan reports, and a known AP database (KAPDB). The KAPDB includes an entry for each known AP that the wireless computing device 260 has detected when scanning for APs. Each entry in the KAPDB also includes: a basic service set (BSS) identifier (BSSID) for each AP, channel/frequency of each AP, one or more AP statistics for each AP (described below), pairwise master key (PMK) information that indicates whether an existing PMK is stored in the memory for that AP, and a AP rating for each AP. In addition, an entry for each candidate AP comprises a candidate AP marker for the candidate AP which indicates that the AP is a candidate for selection, one or more AP statistics for the candidate AP, pairwise master key (PMK) information that indicates whether an existing PMK for that candidate AP is stored in the memory; and an AP rating for the candidate AP.

One of ordinary skill in the art will recognize that when the processor 201 has one or more of its functions performed by a state machine or logic circuitry, the memory 209 containing the corresponding operational instructions may be embedded within the state machine or logic circuitry. The operations performed by the processor 201 and the rest of the wireless computing device 260 are described in detail below.

The transmitter circuitry 203 and the receiver circuitry 205 enable the wireless computing device 260 to communicate information packets to and acquire information packets from the other nodes. In this regard, the transmitter circuitry 203 and the receiver circuitry 205 include conventional circuitry to enable digital or analog transmissions over a wireless communication channel. The transmitter circuitry 203 and the receiver circuitry 205 are designed to operate over both a cellular air interface (e.g., Global System for Mobile communication (GSM), Code Division Multiple Access (CDMA), Wide-band CDMA (WCDMA), Universal Mobile Telecommunications System (UMTS), and the like) and an ad hoc networking air interface (e.g., BLUETOOTH, IEEE 802.11 WLAN interfaces, IEEE 802.16 interfaces, Worldwide Interoperability for Microwave Access (WiMax) interfaces, and the like).

The implementations of the transmitter circuitry 203 and the receiver circuitry 205 depend on the implementation of the wireless computing device 260. For example, the transmitter circuitry 203 and the receiver circuitry 205 can be implemented as an appropriate wireless modem, or as conventional transmitting and receiving components of two-way wireless communication devices. In the event that the transmitter circuitry 203 and the receiver circuitry 205 are implemented as a wireless modem, the modem can be internal to the wireless computing device 260 or insertable into the wireless computing device 260 (e.g., embodied in a wireless radio frequency (RF) modem implemented on a Personal Computer Memory Card International Association (PCMCIA) card). For a wireless communication device, the transmitter circuitry 203 and the receiver circuitry 205 can be implemented as part of the wireless device hardware and software architecture in accordance with known techniques. Most, if not all, of the functions of the transmitter circuitry 203 and/or the receiver circuitry 205 may be implemented in a processor, such as the processor 201. However, the processor 201, the transmitter circuitry 203, and the receiver circuitry 205 have been artificially partitioned herein to facilitate a better understanding.

The receiver circuitry 205 is capable of receiving radio frequency (RF) signals from at least one bandwidth and optionally multiple bandwidths, if the communications with the proximate device are in a frequency band other than that of the network communications. The receiver circuitry 205 may optionally comprise a first receiver and a second receiver, or one receiver capable of receiving in two or more bandwidths. The transceiver 202 includes at least one set of transmitter circuitry 203. The at least one transmitter 203 may be capable of transmitting to multiple devices on multiple frequency bands. As with the receiver 205, dual transmitters 203 may optionally be employed where one transmitter is for the transmission to a proximate node or direct link establishment to WLANs and the other transmitter is for transmission to a cellular base station, for example.

The antenna 206 comprises any known or developed structure for radiating and receiving electromagnetic energy in the frequency range containing the wireless carrier frequencies.

The buffer memory 211 may be any form of volatile memory, such as RAM, and is used for temporarily storing received information packets in accordance with the present invention.

When the wireless computing device 260 is constructed to receive video information from a video source, the wireless computing device 260 further can include a video decoder capable of decoding the current Moving Picture Experts Group (MPEG) standard or some other video decoding standard. When the wireless computing device 260 is further capable of transmitting video information, the wireless computing device 260 further can include a video encoder capable of encoding the video data into at least one of the foregoing video standards. Such video encoder and decoder can be, for example, implemented as part of the processor 201.

Overview

The wireless computing device 160 can authenticate and associate with any number of access points while it is in the network 100 including access points that are not illustrated in FIG. 1. Each time the wireless computing device 160 authenticates with a particular access point, the wireless computing device 160 establishes a pairwise master key (PMK) with that particular access point and stores the PMK in a cache memory with other pairwise master keys (PMKs) that the wireless computing device 160 has previously established with other access points when authenticating with those access points.

As the wireless computing device 160 moves or "roams" about the network, the quality or capacity of its communication link with each AP can change. In some cases, its communication link with its current AP will continue to be the best communication link, while in other cases its communication links with other APs can be better than its communication link with its current AP. In this case it is beneficial for the wireless computing device 160 to select a new AP and to associate and authenticate with the new AP. As such, the wireless computing device 160 regularly scans (either passively or actively) for APs to determine which AP offer the best communication link, and then selects that AP as the AP that it will communicate with.

In accordance with embodiments of the present invention, a wireless computing device 160 is provided that is designed to select one of a plurality of access points (APs) 154 to communicate with in a wireless local area network (WLAN) 100. The wireless computing device 160 stores a pairwise master key (PMK) for each AP that the wireless computing device 160 has previously established a PMK with during authentication. The wireless computing device 160 also includes a known AP database (KAPDB) that includes an entry for each known AP. Each entry includes pairwise master key (PMK) information that indicates whether an existing PMK is stored for that AP. The wireless computing device 160 updates the KAPDB by adding a candidate AP marker to an entry for each of AP detected during scanning. The candidate AP marker indicates that a particular detected AP is a candidate AP. The wireless computing device 160 determines (e.g., measures or obtains) an AP statistic (APS) associated with each candidate AP. The AP statistic is a metric indicative of at least one of: link capacity of the communication link between the wireless computing device 160 and the candidate AP, and link quality of the communication link between the wireless computing device 160 and the candidate AP. The wireless computing device 160 determines (e.g., calculates or computes) an AP rating for each candidate AP based on (1) the APS associated with the candidate AP and (2) whether the wireless computing device 160 has a pairwise master key stored for the candidate AP. The wireless computing device 160 can then select a particular one of the candidate APs having the highest AP rating as a desired AP of the wireless computing device 160.

Non-limiting examples of these techniques will now be described below with reference to FIG. 3.

Figure 3:
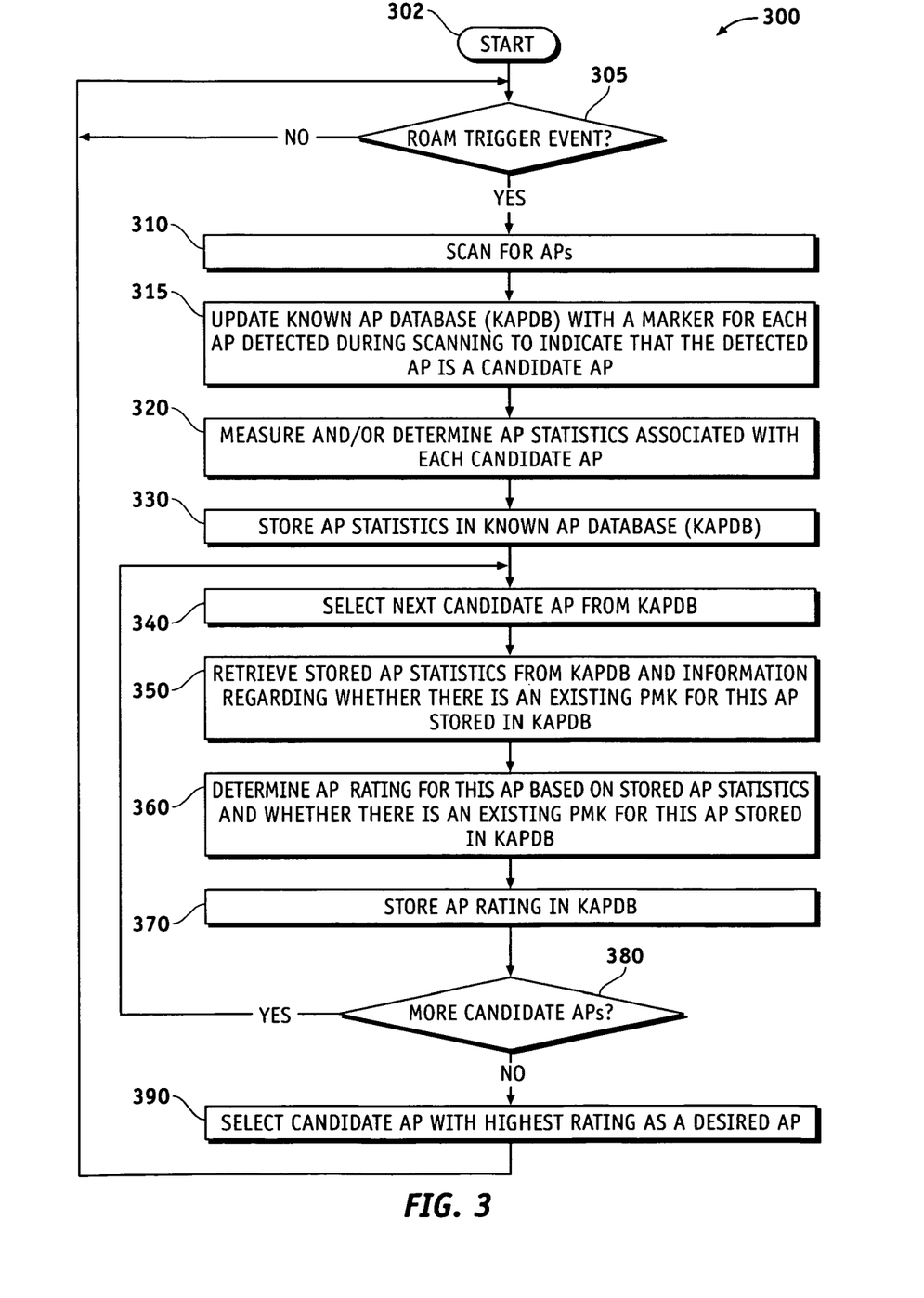
FIG. 3 is a flowchart illustrating a method performed by a wireless computing device for selecting an access point to communicate with from a plurality of access points in accordance with some embodiments of the present invention.

FIG. 3 is a flowchart illustrating a method 300 performed by a wireless computing device 160 for selecting an access point (AP) to communicate with from a plurality of access points in accordance with some embodiments of the present invention. Method 300 will be described below with reference to the exemplary network 100 illustrated in FIG. 1; however, it will be appreciated that application/implementation of method 300 is not limited to the network architecture illustrated in FIG. 1.

At step 305, the wireless computing device 160 determines whether a roaming trigger event has occurred. The roaming trigger event varies depending on the particular implementation. Examples of roaming trigger events include (1) expiration of a timer, (2) observing changes in link quality (e.g., decrease in RSSI or Received Channel Power Indicator (RCPI), a number of missed beacon frames, an increased percentage of unacknowledged packets and/or retransmission of packets). If the wireless computing device 160 determines that a roaming trigger event has not occurred, the method 300 loops back to step 310 where the wireless computing device 160 continues to wait for a roaming trigger event to occur. If the wireless computing device 160 determines that a roaming trigger event has occurred, the method 300 proceeds to step 310.

At step 310, the wireless computing device 160 scans for beacon frames, either passively and/or actively, transmitted by APs within communication range of wireless computing device 160. At the end of a scanning interval, the wireless computing device 160 generates a scan report that includes information for each of the detected APs. This information includes received signal strength (RSSI) (i.e., a measure of the received RF power in a selected channel over the preamble) or Received Channel Power Indicator (RCPI) (i.e., a measure of the received RF power in a selected channel over the preamble and the entire received 802.11 frame), missed probe responses for active scans, age of the AP (i.e., how long since that AP has been observed in a scan), the channel/frequency of the AP, etc. The wireless computing device 160 maintains a count of the number of missed probe responses to track when an AP in the KAPDB fails to respond to probe request (which may include an SSID) sent by the wireless computing device 160 during active scanning.

The wireless computing device 160 maintains a list of candidate APs in its a known AP database (KAPDB). Candidate APs include all APs detected during scanning and can also include APs that are in the KAPDB that were not detected during the most recent scan. Each candidate AP has a service set identifier (SSID) that specifies a name that identifies the WLAN that the wireless computing device 160 wants to attach to. Multiple APs can share the same SSID if they provide access to the same WLAN.

At step 315, the wireless computing device 160 updates a known AP database (KAPDB) by adding each AP detected during scanning to the KAPDB, and marks AP detected during scanning with a marker to indicate that each detected AP is a candidate AP. In other words, each AP detected during scanning is added to the existing list of candidate APs. For example, when the wireless computing device 160 detects an AP that is already included in the KAPDB, the wireless computing device 160 updates an existing entry in the KAPDB for that detected AP with a marker to indicate that the detected AP is a candidate AP. When the wireless computing device 160 detects an AP that is not already included in the KAPDB, the wireless computing device 160 creates a new entry for that detected AP in the KAPDB with a marker to indicate that the detected AP is a candidate AP. In addition, as will be described below, each entry in the KAPDB also includes an AP rating that will be updated at step 370 for each candidate AP.

Method 300 then proceeds to step 320, where the wireless computing device 160 determines AP statistics (APSs) associated with each candidate AP, and at step 330 stores the AP statistics in a known AP database (KAPDB). Depending on the implementation, the wireless computing device 160 can measure APSs based on signals received from the APs, or obtain the APSs from the APs and/or wireless switch 152 (in network architectures where a wireless switch is implemented). The AP statistics (APSs) can include any one of a number of statistics or communication performance metrics that characterize or reflect the link capacity and/or link quality of the communication link between the wireless computing device 160 and the first AP. The APSs can generally include any known Link Quality Metrics (LQMs) and/or Link Capacity Metrics (LCMs). LQMs can include any metrics which reflect channel or link quality between the wireless communication device 150 and the first AP. LCMs can include any metrics which reflect channel or link capacity between the wireless communication device 150 and the first AP. Examples of APSs include: a received signal strength indicator (RSSI) value of a signal received from a candidate AP (i.e., a measure of the received RF power in a selected channel over the preamble of a signal received from a candidate AP), a Received Channel Power Indicator (RCPI) value (i.e., a measure of the received RF power in a selected channel over the preamble and the entire received 802.11 frame received from a candidate AP), a received sensitivity (RS) value of a signal received from a candidate AP (e.g., the lowest level signal strength at which a packet can be successfully recovered such that any packet received with a value less than a threshold RS value will be viewed as noise), a carrier-to-noise ratio (CNR) value of a signal received from a candidate AP; carrier-to-noise-and-interference ratio (CNIR) value of a signal received from a candidate AP; signal-to-noise ratio (SNR) value of a signal received from a candidate AP (usually measured in terms of $E_b/N_0$, which stands for energy per bit divided by the one-sided noise density) or an average thereof; a signal-to-interference ratio (SIRs) value of a signal received from a candidate AP (also referred to as carrier-to-interference ratio (CIR), where the SIR/CIR is the quotient between the average received modulated carrier power S or C and the average received co-channel interference power I); a signal-to-interference-plus-Noise Ratio (SINR) value of a signal received from a candidate AP; packet error rate (PER) estimate of a signal received from a candidate AP or average packet error rate (PER) estimate or the product PER×SINR or an average thereof; the number of multipath signals present during demodulation of a signal received from a candidate AP, a post-detection signal quality (PDSQ) value of a signal received from a candidate AP, an analog gain control (AGC) output value of a signal received from a candidate AP, a transmitted power level (TPL) at which the respective data packets were transmitted by the wireless communication device over the respective links to candidate APs (e.g., the power level at which the wireless communication device finds it necessary to transmit a data-packet over the link); an average of a number of retransmissions per packet (e.g., how many packets are transmitted with up to a pre-defined number of retransmissions); a percentile of the number of retransmissions per packet (e.g., how many packets are transmitted with up to a pre-defined number of retransmissions); number of missed beacon frames from each candidate AP; number of missed probe responses from each candidate AP (when the wireless computing device 160 performs active scanning); age indictors (i.e., age statistics maintained by the wireless computing device that indicate how much time has passed since a packet was received from that candidate AP by the wireless computing device); and advertised data rates supported by each candidate AP. The SIR/CIR resembles the carrier-to-noise ratio (CNR), which is the signal-to-noise ratio (SNR) of a modulated signal before demodulation.

Steps 340-370 describe the processing performed by the wireless computing device 160 to calculate or compute an AP rating for a particular candidate AP; the feedback loop allows the wireless computing device 160 to perform this processing sequence 340-370 for each candidate AP in the KAPDB. At step 340, the wireless computing device 160 selects a candidate AP from the KAPDB. On this first iteration of method 300, the wireless computing device 160 selects the first candidate AP from the KAPDB, and in subsequent iterations of method 300, the wireless computing device 160 selects the next candidate AP from the KAPDB. The first iteration of method 300 will now be described below in which the wireless computing device 160 performs processing to calculate or compute an AP rating for a first candidate AP in the KAPDB.

At step 350, the wireless computing device 160 retrieves stored AP statistics from the KAPDB for the first candidate AP, and also retrieves information regarding whether the KAPDB has an existing PMK stored for the first candidate AP. As described above, the KAPDB may have PMKs stored for APs with which it has previously established a PMK.

At step 360, the wireless computing device 160 determines (e.g., computes or calculates) a first AP rating for the first candidate AP based on an AP rating function (APRF). The specific APRF used to determine an AP rating varies depending on the implementation. In accordance with embodiments of present invention described herein, the APRF can utilize at least one of the AP statistics (APSs) described above in step 320 in conjunction with information regarding whether the wireless computing device 160 has an existing PMK stored for the first candidate AP. By including information regarding whether the wireless computing device 160 has an existing PMK stored for the first candidate AP in the APRF, the APRF gives preference to those APs that the wireless computing device 160 has already established a PMK with. In other words, in a scenario where the wireless computing device 160 has already established (and stored) a PMK with a first candidate AP and has not already established (and stored) a PMK with a second AP, if the first candidate AP and the second AP have equal APSs, the AP rating of the first candidate AP will be higher than the AP rating of the second AP. This way, an AP for which the wireless computing device 160 has a stored PMK will have extra "points" added to its AP rating in comparison to other APs for which the wireless computing device 160 does not have a stored PMK. To illustrate the concept of a APRF a few exemplary implementations are illustrated in FIGS. 4-7 as Equations (1) through (4). These examples are described generically with respect to the specific APS(s) used in the APRF.

Figure 4:
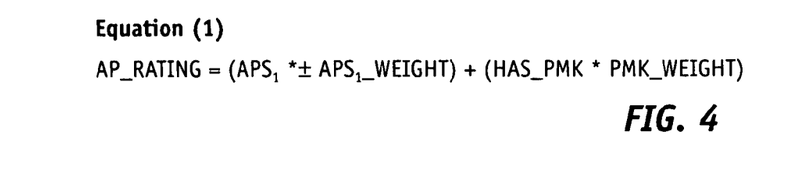
FIGS. 4-7 show exemplary non-limiting AP rating functions (APRFs) in accordance with exemplary implementations of the present invention.

FIG. 4 shows an exemplary non-limiting AP rating function (APRF) in accordance with an exemplary implementation of the present invention. One exemplary implementation of the APRF is shown in Equation (1) of FIG. 4. In Equation (1), the variable $APS_1$ can be any one of the AP statistics (APSs) described above in step 320, and $APS_1\_WEIGHT$ is a constant weighting factor associated with the variable $APS_1$. In Equations (1) (and each of Equations (2)-(4) described below), a positive or negative weight ($\pm$) can be associated with each constant weighting factor depending on whether APS1 is a positive statistic that should increase the AP rating of a particular AP or a negative statistic that should decrease the AP rating of a particular AP. In other words, a particular APS can either increase (i.e., "add to") or decrease (i.e., "subtract from") the AP rating for a particular AP, and therefore a plus sign (+) or a minus sign (−) is associated with the $APS_1$ weighting factor ($APS_1\_WEIGHT$) corresponding to the variable APS1 depending on whether APS1 is a positive statistic that should increase the AP rating of a particular AP or a negative statistic that should decrease the AP rating of a particular AP. More specifically, when $APS_1$ is a positive statistic, then a plus (+) sign is associated with the $APS_1$ weighting factor ($APS_1\_WEIGHT$), and when $APS_1$ is a negative statistic, then a negative (−) sign is associated with the $APS_1$ weighting factor ($APS_1\_WEIGHT$). For instance, if the variable APS1 is a value of a RSSI (or RCPI), then a plus (+) sign is associated with the $APS_1$ weighting factor ($APS_1\_WEIGHT$) since a large RSSI indicates a "good" characteristic and should increase the AP rating of the particular AP. By contrast, if the variable $APS_1$ is a value that reflects a number of consecutive probe responses missed from the particular AP, then a minus (−) sign is associated with the $APS_1$ weighting factor ($APS_1\_WEIGHT$) since missed probe responses are "bad" and should decrease the AP rating of the particular AP. The variable HAS_PMK indicates whether or not the wireless computing device 160 has a PMK stored for this AP; when the wireless computing device 160 has a PMK stored for this AP, the variable HAS_PMK has a value of one (1) and when the wireless computing device 160 does not have a PMK stored for this AP, the variable HAS_PMK has a value of zero (0). The variable HAS_PMK is a positive statistic since having a stored PMK for a particular AP should increase the AP rating of a particular AP. As such, a positive or plus (+) sign is associated with the PMK weighting factor (PMK_WEIGHT).

The example APRF shown in Equation (1) represents the most fundamental APRF in that the APRF includes two terms ($APS_1 * \pm APS_1\_WEIGHT$), and (HAS_PMK* PMK_WEIGHT). In other words, the APRF in Equation (1) uses only two variables (HAS_PMK and $APS_1$) and two constant weighting factors (PMK_WEIGHT and $APS_1\_WEIGHT$) in determining (i.e., calculating or computing) an AP rating of the first candidate AP. However, in other implementations, more than two terms can be included in the APRF in which case an additional term is added to Equation (1) for each additional APS such that two or more APSs can be used in determining an AP rating of the first candidate AP. In such implementations, the APRF can generally be expressed as shown in Equation (2) of FIG. 5.

Figure 5:
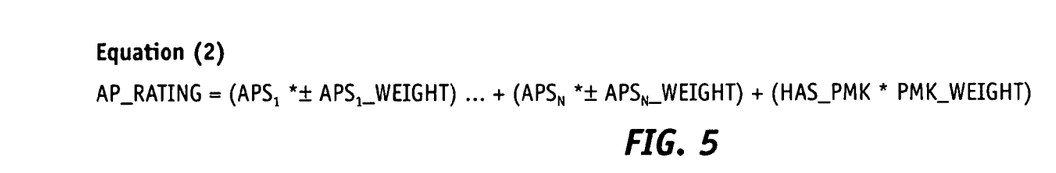

FIG. 5 shows an exemplary non-limiting AP rating function (APRF) in accordance with another exemplary implementation of the present invention. In Equation (2), the integer N can be any number greater than or equal to 2 such that the APRF can use any number of the AP statistics in determining an AP rating of the first candidate AP, where $APS_1 \ldots APS_N$ can be variables that correspond to any one of the AP statistics described above in step 320. For example, in an implementation where N is equal to 3, Equation (2) of FIG. 5 can be expressed as Equation (3) of FIG. 6.

Figure 6:
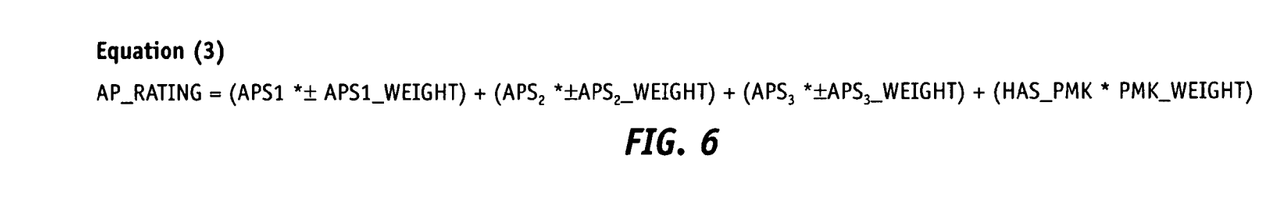

FIG. 6 shows an exemplary non-limiting AP rating function (APRF) in accordance with another exemplary implementation of the present invention.

Figure 7:
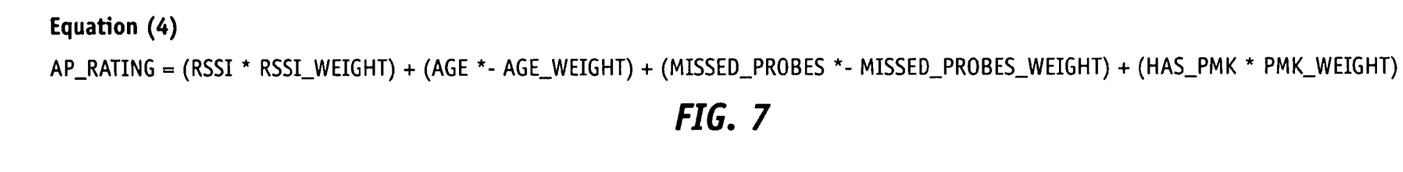

One specific implementation of the APRF in Equation (3) of FIG. 6 is shown in Equation (4) of FIG. 7. In the example shown in FIG. 7, the variable $APS_1$ can be a value that specifies a RSSI received by the wireless computing device 160 from the different candidate APs (i.e., measurement of the RF power or energy present in a radio signal received from a candidate AP) or Received Channel Power Indicator (RCPI) (i.e., a measure of the RF power present in a selected channel over the preamble and the entire 802.11 frame received from a candidate AP), the variable $APS_2$ can be a value that specifies AGE indicator values of the most recent APSs for the different APs that indicates how old the APSs for each candidate AP are (i.e., the variable AGE indicates how much time has passed since a packet was received from that candidate AP by the wireless computing device), and the variable $APS_3$ can be a value that specifies a number of MISSED_PROBES from the candidate APs that indicates how many consecutive probe responses the wireless computing device 160 has missed from a particular candidate AP (i.e., when the wireless computing device 160 performs active scanning the variable MISSED_PROBES is number of missed probe responses from each candidate AP). RSSI_WEIGHT, AGE_WEIGHT, MISSED_PROBES_WEIGHT and PMK_WEIGHT are constant weighting factors associated with each of the variables RSSI, AGE, MISSED_PROBES, and HAS_PMK.

Continuing with FIG. 3, at step 370 the wireless computing device 160 stores the first candidate AP rating of the first candidate AP in the KAPDB. At step 380, the wireless computing device 160 determines if there are any more candidate APs in the KAPDB. If the wireless computing device 160 determines that there are more candidate APs in the KAPDB, then the method 200 loops back to step 340, where the wireless computing device 160 selects the next candidate AP from the KAPDB, and then repeats the processing described in steps 350-370.

If the wireless computing device 160 determines that there are no more candidate APs in the KAPDB, then the method 300 proceeds to step 390, where the wireless computing device 160 selects a particular one of the candidate APs with the highest AP rating as a desired AP that the wireless computing device 160 intends to communicate with.

In some cases, the desired AP (i.e., the selected candidate AP that has the highest AP rating) will be the current AP that the wireless computing device 160 is currently or presently communicating through, in which case the wireless computing device 160 does nothing and continues to communicate through its current AP.

In other cases, the desired AP (i.e., the selected candidate AP that has the highest AP rating) will be a new AP that is different than the current AP that the wireless computing device 160 is communicating through. In these cases, the wireless computing device 160 initiates a roam to the desired AP by sending an IEEE 802.11 authentication packet to begin IEEE 802.11 authentication process, and the desired AP responds with an IEEE 802.11 authentication packet. Then, to being the IEEE 802.11 association process, the wireless computing device 160 then sends an IEEE 802.11 association request packet, which varies depending on whether or not the wireless computing device 160 has a PMK stored for the desired AP.

If the wireless computing device 160 does not have a PMK stored for the desired AP, the wireless computing device 160 sends a regular IEEE 802.11 association request packet to the desired AP, and the desired AP sends an IEEE 802.11 association response packet. If the wireless computing device 160 or desired AP does not have a cached PMK to use, the desired AP will instead start an IEEE 802.1x authentication process after sending the IEEE 802.11 association response packet by sending an IEEE 802.1x identity request which begins the entire IEEE 802.1x authentication. After the wireless computing device 160 and the desired AP mutually authenticate via IEEE 802.1x, the desired AP will send the wireless computing device 160 the first message of a 4-way handshake to calculate other keys prior to starting the 4-way handshake.

By contrast, if the wireless computing device 160 has a PMK stored for the desired AP, the wireless computing device 160 sends an IEEE 802.11 association request packet that includes a PMK identifier (ID) so the desired AP knows that the wireless computing device 160 intends to use a cached PMK, and the desired AP sends an IEEE 802.11 association response packet. If the wireless computing device 160 indicated the wireless computing device 160 has a cached PMK, and the desired AP also has a cached PMK, there is not need to perform IEEE 802.1x authentication, and the desired AP will send the wireless computing device 160 the first message of a 4-way handshake to calculate other keys.

While at least one exemplary embodiment has been presented in the foregoing detailed description of the invention, it should be appreciated that a vast number of variations exist. It should be also appreciated that the exemplary embodiment or exemplary embodiments are only examples, and are not intended to limit the scope, applicability, or configuration of the invention in any way. One of ordinary skill in the art appreciates that various modifications and changes can be made without departing from the scope of the invention as set forth in the claims below. As such, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents. Accordingly, the specification and figures are to be regarded in an illustrative rather than a restrictive sense, and all such modifications are intended to be included within the scope of present teachings. In addition, the benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method performed by a wireless computing device for selecting an access point (AP) to communicate with from a plurality of candidate access points (APs) when roaming in a wireless local area network (WLAN), the method comprising:

storing a pairwise master key (PMK) for each access point that the wireless computing device has previously established a PMK with during authentication in memory at the wireless computing device to create a PMK cache having a plurality of PMKs;

identifying a plurality of candidate access points at the wireless computing device;

determining an AP statistic (APS) associated with each candidate AP, the APS being based on at least one of a link capacity of a communication link between the wireless computing device and a candidate AP and a link quality of a communication link between the wireless computing device and a candidate AP;

determining an AP rating for each candidate AP in a known AP database (KAPDB) based on an AP rating formula (APRF) comprising: a first variable based on the APS for the candidate AP and a second variable that indicates whether the wireless computing device has a pairwise master key stored for the candidate AP, wherein the APRF comprises a first term equal to the product of a first variable based on the APS for each candidate AP, and a first constant weighting factor associated with the first variable, and a second term equal to the product of a second variable that indicates whether the wireless computing device has a pairwise master key stored for the candidate AP, and a second constant weighting factor associated with the second variable, and wherein the AP rating that results for each candidate AP from the APRF is equal to the sum of the first term and the second term; and selecting a particular one of the candidate APs having the highest AP rating as a desired AP of the wireless computing device.

2. A method according to claim 1, wherein the second variable is equal to one when the wireless computing device has a pairwise master key stored for the candidate AP, and wherein the second variable is equal to zero when the wireless computing device does not have a pairwise master key stored for the candidate AP.

3. A method according to claim 1, wherein the first constant weighting factor one of: a positive number that increases the AP rating that results for each candidate AP from the APRF, and a negative number that decreases the AP rating that results for each candidate AP from the APRF.

4. A method according to claim 1, wherein the APS is a first APS, and wherein the step of determining an AP statistic (APS) associated with each candidate AP comprises:

determining a first AP statistic (APS) and a second APS associated with each candidate AP, and wherein the AP rating formula (APRF) further comprises:

a third term equal to: the product of a third variable based on a second APS for each candidate AP, and a third constant weighting factor associated with the third variable, wherein the AP rating that results for each candidate AP from the APRF is equal to the sum of the first term, the second term and the third term.

5. A method according to claim 4, wherein the first constant weighting factor and the third constant weighting factor are one of either: a positive number that increases the AP rating that results for each candidate AP from the APRF, or a negative number that decreases the AP rating that results for each candidate AP from the APRF.

6. A method according to claim 4, wherein the APS comprises a metric indicative of link capacity of the communication link between the wireless computing device and the candidate APs.

7. A method according to claim 4, wherein the APS comprises a metric indicative of link quality of the communication link between the wireless computing device and the candidate APs.

8. A method according to claim 4, wherein the first APS is different than the second APS, and wherein the first APS comprises one of:

a received signal strength indicator (RSSI) value that reflects energy present in a radio signal received from a candidate AP;

a received channel power indicator (RCPI) value that reflects energy present in a radio signal received from a candidate AP;

a received sensitivity (RS) value of a signal received from a candidate AP;

a carrier-to-noise ratio (CNR) value of a signal received from a candidate AP;

a carrier-to-noise-and-interference ratio (CNIR) value of a signal received from a candidate AP;

a signal-to-noise ratio (SNR) value of a signal received from a candidate AP;

a signal-to-interference-plus-Noise Ratio (SINR) value of a signal received from a candidate AP;

a packet error rate (PER) estimate of a signal received from a candidate AP;
a number of multipath signals present during demodulation,
a post-detection signal quality (PDSQ) value of a signal received from a candidate AP,
an analog gain control (AGC) output value of a signal received from a candidate AP,
a transmitted power level (TPL) at which the respective data packets were transmitted by the wireless communication device over a link between the wireless communication device and a candidate AP;
an average of a number of retransmissions per packet;
a number of missed probe responses from a candidate AP that indicates how many consecutive probe responses the wireless computing device has missed from that candidate AP;
an AGE indicator value for a candidate AP that reflects age of AP statistics for that candidate AP by indicating how much time has passed since a packet was received from that candidate AP; and
advertised data rates supported by a candidate AP.

9. A method according to claim 1, wherein the step of determining an AP rating for each candidate AP in a known AP database (KAPDB) based on an AP rating formula (APRF) comprising: (1) a first variable based on the APS for the candidate AP and (2) a second variable that indicates whether the wireless computing device has a pairwise master key stored for the candidate AP, comprises:
retrieving, from the KAPDB, a stored AP statistic and pairwise master key (PMK) information for each candidate AP, wherein the PMK information for each candidate AP indicates whether the wireless computing device has an existing PMK stored for that candidate AP;
determining an AP rating for each candidate AP in KAPDB based on an AP rating formula (APRF) comprising: (1) a first variable based on the APS for the candidate AP and (2) a second variable that indicates whether the wireless computing device has a pairwise master key stored for the candidate AP; and
storing the AP ratings for each candidate AP in the KAPDB.

10. A method according to claim 1, wherein the step of identifying a plurality of candidate access points at the wireless computing device, comprises:
determining whether a roaming trigger event has occurred;
scanning for beacon frames transmitted from access points when a roaming trigger event has occurred;
detecting at least one access point; and
updating a known AP database (KAPDB) stored at the wireless computing device by adding a marker to an entry for each of AP detected during scanning, wherein each marker indicates that a particular detected AP is a candidate AP.

11. A method according to claim 10, wherein the step of determining an AP statistic (APS) associated with each candidate AP, comprises:
determining an AP statistic (APS) associated with each candidate AP in the KAPDB; and
storing each AP statistic in the KAPDB as stored AP statistic for a corresponding candidate AP.

12. A wireless computing device designed to select an access point (AP) to communicate with from a plurality of candidate access points (APs) when roaming in a wireless local area network (WLAN), the method comprising:
a memory comprising a known AP database (KAPDB) comprising an entry for each candidate AP and designed to store a pairwise master key (PMK) for each access point that the wireless computing device has previously established a PMK with during authentication thereby creating a PMK cache having a plurality of PMKs; and
a processor designed to identify a plurality of candidate access points, wherein the processor is further designed to:
determine an AP statistic (APS) associated with each candidate AP, the APS being based on at least one of a link capacity of a communication link between the wireless computing device and a candidate AP and a link quality of a communication link between the wireless computing device and a candidate AP,
determine an AP rating for each candidate AP in the KAPDB based on an AP rating formula (APRF) comprising: a first variable based on the APS for the candidate AP and a second variable that indicates whether the wireless computing device has a pairwise master key stored for the candidate AP, wherein the APRF comprises a first term equal to the product of a first variable based on the APS for each candidate AP, and a first constant weighting factor associated with the first variable, and a second term equal to the product of a second variable that indicates whether the wireless computing device has a pairwise master key stored for the candidate AP, and a second constant weighting factor associated with the second variable, and wherein the AP rating that results for each candidate AP from the APRF is equal to the sum of the first term and the second term, and
select a particular one of the candidate APs having the highest AP rating as a desired AP of the wireless computing device.

13. A method according to claim 12, wherein the AP rating formula (APRF) comprises:
a first term equal to: the product of a first variable based on the APS for each candidate AP, and a first constant weighting factor associated with the first variable, wherein the second constant weighting factor one of: a positive number that increases the AP rating that results for each candidate AP from the APRF, and a negative number that decreases the AP rating that results for each candidate AP from the APRF; and
a second term equal to: the product of a second variable that indicates whether the wireless computing device has a pairwise master key stored for the candidate AP, and a second constant weighting factor associated with the second variable, wherein the second variable is equal to one when the wireless computing device has a pairwise master key stored for the candidate AP, and wherein the second variable is equal to zero when the wireless computing device does not have a pairwise master key stored for the candidate AP, and
wherein the AP rating that results for each candidate AP from the APRF is equal to the sum of the first term and the second term.

14. A method according to claim 13, wherein the APS is a first APS, and wherein the processor is further designed to determine and a second APS associated with each candidate AP, and
wherein the AP rating formula (APRF) further comprises:
a third term equal to: the product of a third variable based on a second APS for each candidate AP, and a third constant weighting factor associated with the third variable, wherein the third constant weighting factor is one of either: a positive number that increases the AP rating that results for each candidate AP from the APRF, or a negative number that decreases the AP rating that results for each candidate AP from the APRF, wherein the AP rating that results for each candidate AP from the APRF is equal to the sum of the first term, the second term and the third term.

15. A method according to claim 12, wherein the processor is designed to scan for beacon frames transmitted from access points when a roaming trigger event has occurred, and to update the known AP database (KAPDB) by adding a marker to an entry for each of AP detected during scanning, wherein each marker indicates that a particular detected AP is a candidate AP.

16. A method according to claim 15, wherein the KAPDB comprises a plurality of entries for each known AP including the candidate APs, wherein an entry for each candidate AP comprises:

a candidate AP marker for the candidate AP;

an AP statistic for the candidate AP, wherein the AP statistic comprises a metric indicative of at least one of: link capacity of the communication link between the wireless computing device and the candidate AP, and link quality of the communication link between the wireless computing device and the candidate APs;

pairwise master key (PMK) information that indicates whether an existing PMK for that candidate AP is stored in the memory; and an AP rating for the candidate AP.

17. A wireless local area network (WLAN), comprising:

a plurality of access points; and a wireless computing device designed to select one of the access points (AP) to communicate with, the wireless computing device comprising:

a memory designed to store a pairwise master key (PMK) for each access point that the wireless computing device has previously established a PMK with during authentication thereby creating a PMK cache having a plurality of PMKs, wherein the memory comprises: a known AP database (KAPDB) comprising an entry for each candidate AP, wherein each entry includes pairwise master key (PMK) information that indicates whether an existing PMK for that AP is stored in the PMK cache; and a processor designed to scan for beacon frames transmitted from access points when a roaming trigger event has occurred, and to update the known AP database (KAPDB) by adding a candidate AP marker to an entry for each of AP detected during scanning, wherein each candidate AP marker indicates that a particular detected AP is a candidate AP, wherein the processor is further designed to:

determine an AP statistic (APS) associated with each candidate AP, wherein the AP statistic comprises a metric indicative of at least one of: link capacity of the communication link between the wireless computing device and the candidate AP, and link quality of the communication link between the wireless computing device and the candidate AP, determine an AP rating for each candidate AP in the KAPDB based on an AP rating formula (APRF) comprising: a first variable based on the APS for the candidate AP and a second variable that indicates whether the wireless computing device has a pairwise master key stored for the candidate AP, wherein the APRF comprises a first term equal to the product of a first variable based on the APS for each candidate AP, and a first constant weighting factor associated with the first variable, and a second term equal to the product of a second variable that indicates whether the wireless computing device has a pairwise master key stored for the candidate AP, and a second constant weighting factor associated with the second variable, and wherein the AP rating that results for each candidate AP from the APRF is equal to the sum of the first term and the second term, and select a particular one of the candidate APs having the highest AP rating as a desired AP of the wireless computing device.

* * * * *

UNITED STATES PATENT AND TRADEMARK OFFICE
CERTIFICATE OF CORRECTION

| | |
|---|---|
| PATENT NO. | : 8,363,617 B2 |
| APPLICATION NO. | : 12/199599 |
| DATED | : January 29, 2013 |
| INVENTOR(S) | : Meyer |

It is certified that error appears in the above-identified patent and that said Letters Patent is hereby corrected as shown below:

In the Specifications

In Column 13, Line 64, delete "is not" and insert -- is no --, therefor.

Signed and Sealed this
Twenty-eighth Day of May, 2013

Teresa Stanek Rea
*Acting Director of the United States Patent and Trademark Office*